(12) United States Patent
Peterson et al.

(10) Patent No.: US 8,001,914 B2
(45) Date of Patent: Aug. 23, 2011

(54) AIR-ASSISTED PLANTING SYSTEM HAVING A SINGLE FAN WITH PRESSURE-RESPONSIVE SPLITTING OF AIR STREAMS FOR CONVEYING AND METERING FUNCTIONS

(75) Inventors: Bruce D. Peterson, Lindsborg, KS (US); Brent W. Nelson, Falun, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 0 days.

(21) Appl. No.: 12/483,552

(22) Filed: Jun. 12, 2009

(65) Prior Publication Data
US 2010/0313801 A1 Dec. 16, 2010

(51) Int. Cl.
*A01C 7/00* (2006.01)
*A01C 9/00* (2006.01)
*A01C 15/00* (2006.01)
*G06F 7/70* (2006.01)
*G06F 19/00* (2006.01)

(52) U.S. Cl. .......... 111/175; 111/185; 111/200; 701/50; 222/630; 340/611; 340/627; 340/684

(58) Field of Classification Search ............... 111/34, 111/170, 171, 174–177, 183–185, 200, 900, 111/903, 904; 701/50; 221/211; 222/195, 222/630; 406/141–143, 146, 120, 124, 181, 406/41; 340/684, 627, 611; 73/199, 861.05, 73/861, 53, 861.41, 1.24, 1.35, 1.58, 1.71
See application file for complete search history.

(56) References Cited

U.S. PATENT DOCUMENTS

| 3,965,873 | A | 6/1976 | Konomi et al. |
| 3,999,690 | A | 12/1976 | Deckler |
| 4,118,173 | A | 10/1978 | Shakiba |
| 4,356,934 | A | 11/1982 | Knake |
| 4,503,786 | A | 3/1985 | Tautfest |
| 4,843,983 | A | 7/1989 | Olson |
| 5,267,547 | A | 12/1993 | Chikamatsu et al. |
| 5,515,795 | A | 5/1996 | Ledermann et al. |
| 5,575,225 | A | 11/1996 | Smith et al. |
| 5,579,343 | A | 11/1996 | Ohmura |
| 5,601,209 | A | 2/1997 | Barsi et al. |
| 5,740,746 | A | 4/1998 | Ledermann et al. |

(Continued)

FOREIGN PATENT DOCUMENTS
EP 0958726 A2 11/1999
(Continued)

OTHER PUBLICATIONS

Notification of Transmittal of the International Search Report and the Written Opinion of the International Searching Authority, or the Declaration; Dated Mar. 25, 2011; 10 pages.

*Primary Examiner* — Christopher J. Novosad
(74) *Attorney, Agent, or Firm* — Hovey Williams LLP

(57) ABSTRACT

To produce, monitor, and control a flow of air for a seed conveying system and a seed metering system, an air-assisted planting system includes an air handling system having a single air source and an air controller for maintaining a generally constant air pressure to the metering system. The air controller includes a plurality of sensors associated with and operable to monitor an air pressure through the metering system. Based on a sensed air pressure, a microprocessor of the air controller instructs the air handling system to selectively divert the flow of air to the metering system on an as-needed basis to maintain the generally constant air pressure.

9 Claims, 8 Drawing Sheets

U.S. PATENT DOCUMENTS

| | | |
|---|---|---|
| 5,997,516 A | 12/1999 | Caro et al. |
| 6,047,652 A | 4/2000 | Prairie et al. |
| 6,164,222 A | 12/2000 | Mayerie et al. |
| 6,192,813 B1 | 2/2001 | Memory et al. |
| 6,308,646 B1 | 10/2001 | Luxon |
| 6,644,225 B2 | 11/2003 | Keaton |
| 6,883,445 B2 | 4/2005 | Mayerle |
| 7,182,029 B2 | 2/2007 | Johnson et al. |
| 7,213,525 B2 | 5/2007 | Meyer et al. |
| 7,373,890 B2 | 5/2008 | Kowalchuk |

FOREIGN PATENT DOCUMENTS

| | | |
|---|---|---|
| WO | WO 97/03007 | 1/1997 |

AIR-ASSISTED PLANTING SYSTEM HAVING A SINGLE FAN WITH PRESSURE-RESPONSIVE SPLITTING OF AIR STREAMS FOR CONVEYING AND METERING FUNCTIONS

TECHNICAL FIELD

Embodiments of the invention relate to air-assisted planting systems for use in agriculture planters, including mounted, semi-mounted, and pull-type planters. More particularly, embodiments of the present invention relate to an air-assisted planting system having an air splitter assembly operable to split a flow of air, produced from a single air source, for both conveying and metering functions for seeds to be planted. Embodiments of the present invention are also operable to monitor and vary the flow of air for the seed metering function based on a sensed air pressure.

BACKGROUND AND SUMMARY

Planters commonly employ an on-demand, air-assisted seed conveying system to transport, deliver, or otherwise convey a plurality of seeds stored in a central bulk seed container mounted to the planter to locations along a width of the planter for planting in furrowed rows. A flow of air produced from a first air source is guided to a manifold that receives seeds from the container, where it gathers a plurality of seeds, and is then pushed, along with the gathered seeds, to a plurality of row units along the planter.

Planters also commonly employ a second air system produced from a second air source to assist the seed singulating meters of the machine in singulating seeds from the mass of seeds supplied to the row units by the conveying system. Unlike grain drills where a metered stream of multiple seeds is dispensed to the ground, a planter must be able to singularly meter and drop one seed at a time, such that, ideally, a row of spaced-apart, singular seeds is planted in the furrow.

In prior art planters, it is common to provide two air sources for the seed conveying and seed metering functions described above. The purpose for doing so is that the metering air pressure to the seed meters must remain generally constant for accurate singular seed metering. During operation of the planter, it is common to have significant and frequent fluctuations of a fan speed (the air source for the seed metering system) due to changing operating conditions of a tractor pulling the planter and the planter. For example, when the planter turns at an end of the field and prepares for the next pass in the opposite direction, a drain on a hydraulic motor is commonly experienced, which results in reduced RPM and the fan slowing and not producing as high an air pressure. With a reduced air pressure, the risk of multiple seed skips is increased.

For the first air source that is providing the flow of transporting air to the seed conveying system, a change in pressure of the flow of air is not particularly problematic, as the seed conveying system does not require a generally constant or uniform supply of air pressure. However, for the second air source that is providing the flow of air to the seed meters, a generally constant or uniform air pressure is desired so as to facilitate the singular metering of the seeds. Given the disparate air pressure requirements for the seed conveying and seed metering, prior art planters commonly employ the dual air sources.

Accordingly, there is a need for an air-assisted planting system that is provided with a single air source for both the seed conveying and seed metering functions. More particularly, there is a need for an air-assisted planting system that maintains an air pressure to the seed metering system at the expense of the seed conveying system. As such, there is a need for an air-assisted planting system operable to produce, monitor, and control the air pressure provided to the conveying system and the metering system, and, based upon a sensed air pressure to the metering system, to selectively divert a flow of air to either or both of the conveying system and metering systems so as to insure stabilized air pressure to the metering system.

Embodiments of the present invention solve the above-described problems and provide a distinct advance in the art of air-assisted planting systems for planters. More particularly, embodiments of the present invention provide an air-assisted planting system having a single source of a flow of air for both the conveying system and the metering system. The flow of air can be selectively diverted and divided to provide generally constant and uniform air pressure to the seed meters. In more detail, embodiments of the present invention comprise a conveying system including a bulk seed hopper, an on-demand seed manifold, a primary seed conveying air line, and a plurality of secondary seed conveying air lines; a seed metering system including a primary metering air line, a metering air manifold, a plurality of secondary metering air lines, and a plurality of corresponding singulating meters on row units that receive air from the secondary air lines; and an air handling system operable to produce, monitor, and control a flow of air, wherein the air handling system is in fluid communication with the conveying system and the metering system and includes a single fan assembly, an air splitter assembly, and an air controller.

BRIEF DESCRIPTION OF THE DRAWINGS

Embodiments of the present invention are described in detail below with reference to the attached drawing figures, wherein.

Figure 1:
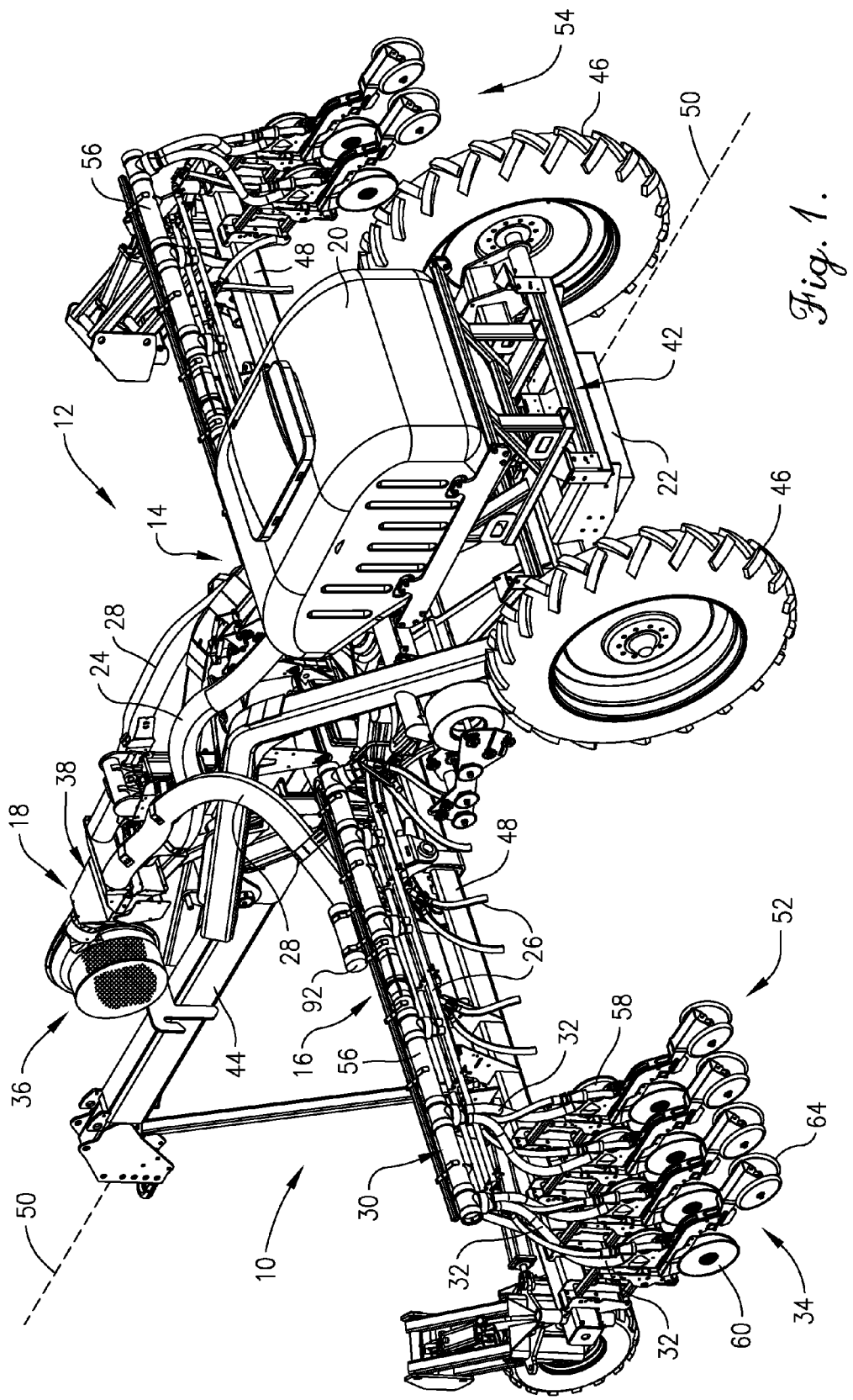
FIG. 1 is a left, rear isometric view of an agriculture planter incorporating an air-assisted planting system in accordance with the principles of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The present invention is susceptible of embodiment in many different forms. While the drawings illustrate and the specification describes certain embodiments of the invention, it is to be understood that such disclosure is by way of example only. There is no intent to limit the principles of the present invention to the particular disclosed embodiments.

Figure 3A:
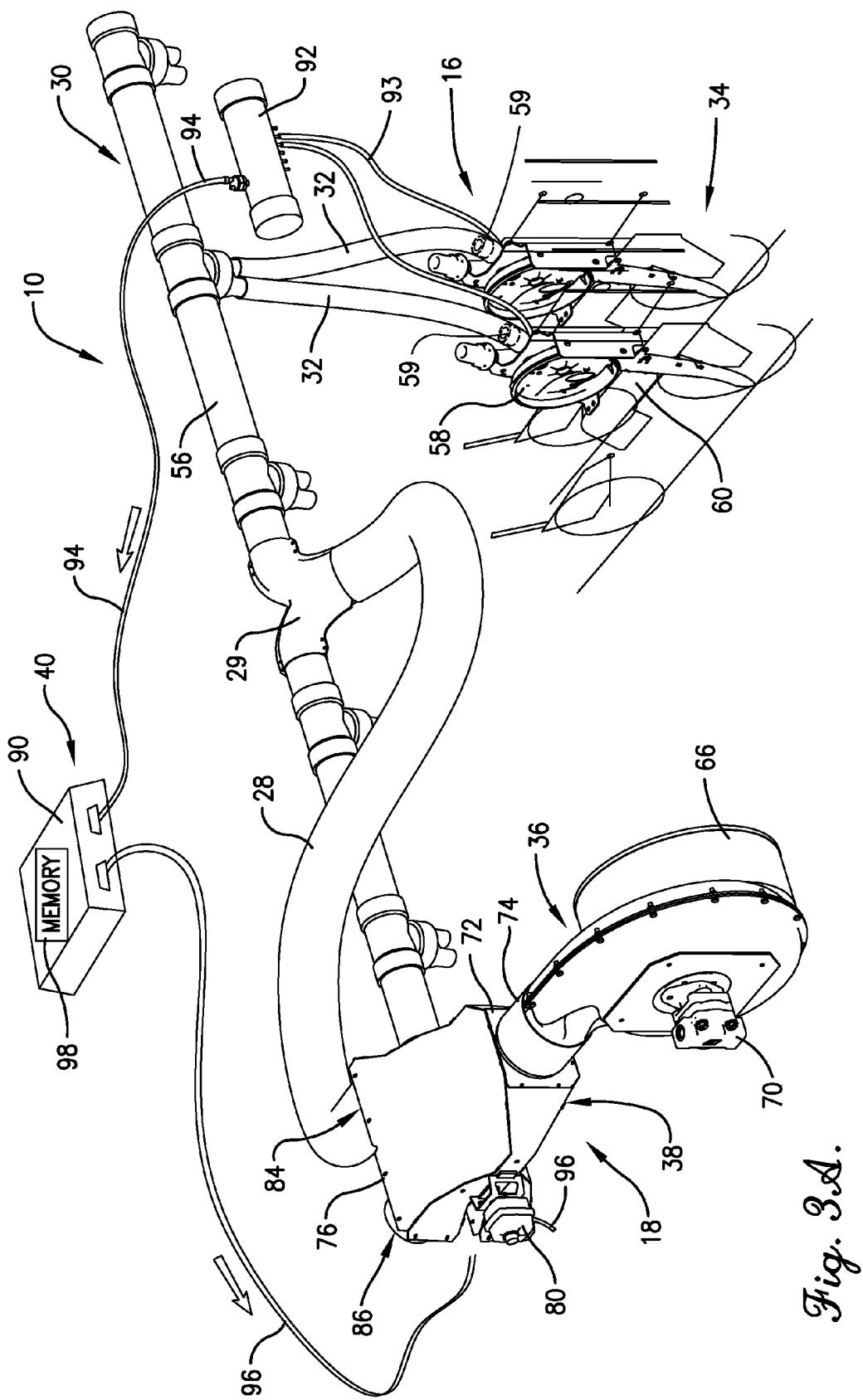
FIG. 3A is a partial schematic, right, front isometric view of the air handling system of FIG. 1 and illustrating a pressure sensor of embodiments of the present invention.

Embodiments of the present invention provide an air-assisted planting system 10 operable to provide positive pressure air to both convey and meter seeds in an agriculture planter 12. The air-assisted planting system 10 of embodiments of the present invention comprises a seed conveying system 14; a seed metering system 16; and an air handling system 18. The seed conveying system 14 includes a central bulk seed hopper 20, an on-demand seed manifold 22 below hopper 20, a primary conveying air line 24 leading to manifold 22, and a plurality of secondary conveying air lines 26 leading from manifold 22. The seed metering system 16 includes a primary metering air line 28 for each section of the machine, a metering air manifold 30 for each primary line 28, a plurality of secondary metering air lines 32 leading from each corresponding manifold 30, and a plurality of singulating meters 58 associated with a corresponding numbers of row units 34. The air handling system 18 is in fluid communication with the conveying system 14 and the metering system 16 and includes a fan assembly 36, an air splitter assembly 38, and an air controller 40 (FIG. 3A). The air handling system 18 is operable to produce, monitor, and control a flow of air to the conveying and metering systems 14,16.

Referring to FIG. 1, the agriculture planter 12 of embodiments of the present invention is a pull-type planter comprising a mobile frame 42 adapted to be connected to a tractor or other vehicle (not shown) via a hitch tongue 44 for towing behind the tractor. Alternatively, instead of tongue 44 the planter 12 could include a coupling that adapts the planter for connection to the three-point hitch (not shown) of a tractor. The frame 42 is mounted on a plurality of wheels 46, at least one of which may be utilized to provide driving power for various driven components of the planter 12 as the wheels 46 engage and are rotated by the ground during forward travel of the planter 12. The frame 42 includes a transverse tool bar 48 upon which the plurality of row units 34 are mounted across the width of the planter 12.

The conveying system 14 of embodiments of the present invention is operable to store and convey seeds to the singulating meters 58 of metering system 16. In more detail and referring to FIGS. 1 and 2, the bulk seed hopper 20 stores a plurality of seeds to be planted by the planter 12. The bulk seed hopper 20 is mounted atop the on-demand seed manifold 22 positioned generally vertically below the bulk seed hopper 20 and mounted to the frame 42 of the planter 12. Gravity drops the seeds stored in the hopper 20 into the seed manifold 22, which is commonly of a much smaller volumetric size than the hopper 20. An exemplary bulk seed hopper 20 and on-demand seed manifold 22 are described in U.S. Pat. No. 7,086,342 owned by the assignee of the present invention and herein incorporated by reference in its entirety.

As is common in the art, the hopper 20 is positioned along a general longitudinal center axis 50 of the planter 12, and the plurality of row units 34 are positioned on general left and right sides 52,54 of the planter 12. Viewing the planter 12 from its rear, the left side 52 of the planter 12 is illustrated on a general left hand side of FIG. 1, and the right side 54 of the planter 12 is illustrated on a general right hand side of FIG. 1. As can be appreciated, components of the left and right hand sides 52,54 of the planter 12 are substantially similar. Thus, for ease of reference herein, embodiments of the present invention will only be described with respect to the left hand side 52 of the planter 12, unless the components are different for each of the sides 52,54. Additionally, only a select number of row units 34 are illustrated on each side 52,54 of the planter 12 in FIG. 1 for ease of illustration. However, it should be appreciated that each side 52,54 of the planter 12 will include a plurality of row units 34. Moreover, it should be appreciated that the hopper 20 could be positioned at a different location on the planter 12 and/or multiple hoppers 20 could be employed.

As can be appreciated, although the agriculture planter 12 of embodiments of the present invention has been described as a dual system having left and right sides 52,54 (also referred to in the art as "wings" or "sections"), the planter 12 may also have only a single section or more than two sections. Furthermore, in alternative embodiments of the present invention, the planter 12 can be a mounted or a semi-mounted planter 12.

Figure 2:
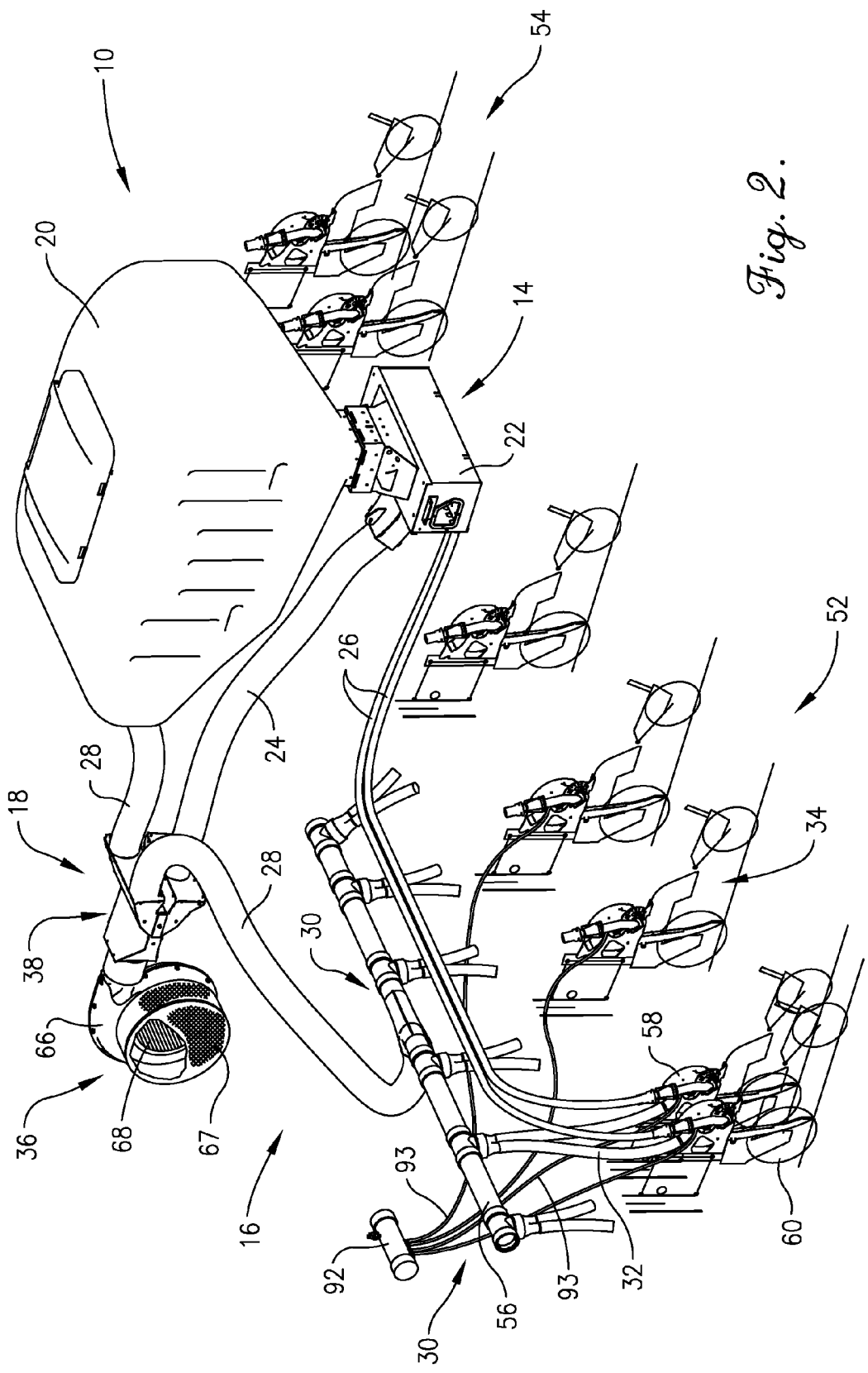
FIG. 2 is a partial schematic and fragmentary left, rear isometric view of the air-assisted planting system of FIG. 1 and further illustrating a seed conveying system, a seed metering system, and an air handling system.

The primary conveying air line 24 and the plurality of secondary seed conveying air lines 26 are in fluid communication with the seed manifold 22, respectively leading to and from manifold 22. Referring to FIG. 2, and as described in more detail below, positive pressure air is pushed through the primary conveying air line 24 and into the seed manifold 22. The flow of air then exits the seed manifold 22 via the plurality of secondary seed conveying air lines 26. As the air exits the manifold 22, it carries with it seeds through the secondary seed conveying air lines 26.

Each of the plurality of secondary seed conveying air lines 26 is respectively connected to the meters 58 of the row units 34. Thus, as the air exits the seed manifold 22 and carries the seeds with it, the seeds are eventually provided to the meters 58 of the respective row units 34 for planting, as described in more detail below.

The metering system 16 of embodiments of the present invention is operable to singularly meter the seeds into a plurality of planting rows (not shown) for planting. In more detail and referring to FIGS. 1-3, positive pressure air is pushed through the primary metering air line 28 and to the metering air manifold 30, which are connected via a wye 29. The metering air manifold 30 comprises a long, cylindrical tube 56 extending generally horizontally across each side of the planter 12. In alternative embodiments of the present invention, the metering air manifold 30 may comprise a rectangular or square-shaped tube or any other suitably shaped tube.

Referring to FIG. 3A, as the positive pressure air exits the wye 29, it branches in opposite directions along the metering air manifold 30. The positive pressure air pushed to the metering air manifold 30 is then pushed to secondary metering air lines 32 spaced intermittently along the metering air manifold 30 and extending downwardly towards corresponding row units 34. Each secondary metering air line 32 is fluidly connected to the singulating meter 58 of the corresponding row unit 34 for the purpose of supplying that meter 58 with the positive pressure air needed to accomplish accurate seed singulation.

As can be appreciated, the air pressure along the manifold 30 is greatest where it is supplied from the primary metering air line 28 at the wye 29 and drops as the air moves downstream and outboard through the manifold 30. As discussed in more detail below, it is desirable for the air pressure at each singulating meter 58 to remain fairly constant. To accomplish this, a selectively adjustable orifice 59 is provided proximate to the singulating meter 58 and within each secondary seed metering air line 32, as illustrated in FIG. 3. The orifice allows for selectively regulating the air pressure to the singulating meter 58. In embodiments of the present invention, the orifice 59 comprises an insert (not shown) configured to be selectively adjusted to a diameter less than a diameter of the secondary seed metering air line 32 so as to regulate the air pressure to the meter 58. Depending on a location of the meter 58 on the planter 12, and consequently, an amount of air pressure supplied to the secondary seed metering air line 32 from the manifold 30, the diameter of the orifice insert may vary to allow an increase or a decrease of the pressure to the meter 58.

Each row unit 34 comprises an opener 60 below the meter 58. The opener 60 opens a furrow in the planting row so that the singulating meter 58 can drop the seed into the furrow, and a pair of closing wheels 64 close the furrow once the seed is planted. In the illustrated embodiment of the present invention, the opener 60 is a double disc opener. One suitable singulating meter 58 for use with the present invention is described in U.S. Pat. No. 3,999,690, which patent is hereby incorporated by reference in its entirety into the present specification.

As noted above, the air handling system 18 of embodiments of the present invention is operable to produce, monitor, and control the flow of air through the air-assisted planting system 10. In more detail and referring to FIGS. 2 and 3, the flow of air is produced by the fan assembly 36, which is mounted along the general longitudinal center axis 50. Referring to FIG. 2, the fan assembly 36 comprises a fan body 66, a fan intake screen 67, a fan 68 mounted within the fan body 66, and a motor 70 mounted on the fan body 66 for rotating fan 68. The fan assembly 36 intakes air from atmosphere through the fan intake screen 67 and serves to collect and direct the air through the fan body 66 and to the air splitter assembly 38. Embodiments of the present invention employ a single fan assembly 36 for operation of both the conveying and metering systems 14,16.

Figure 3B:
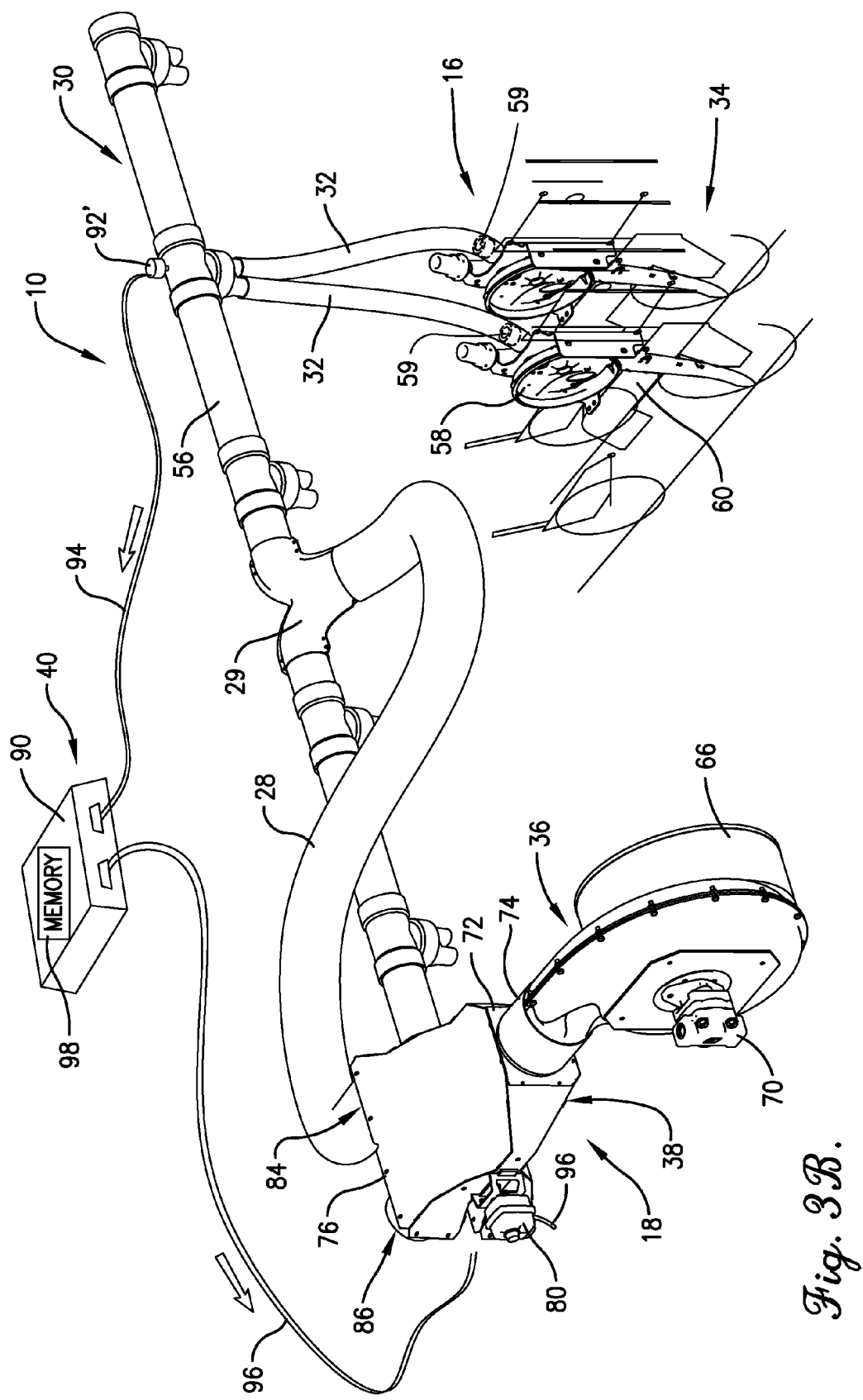
FIG. 3B is a partial schematic, right, front isometric view of the air handling system of FIG. 1 and illustrating a pressure sensor of alternative embodiments of the present invention.
Figure 4A:
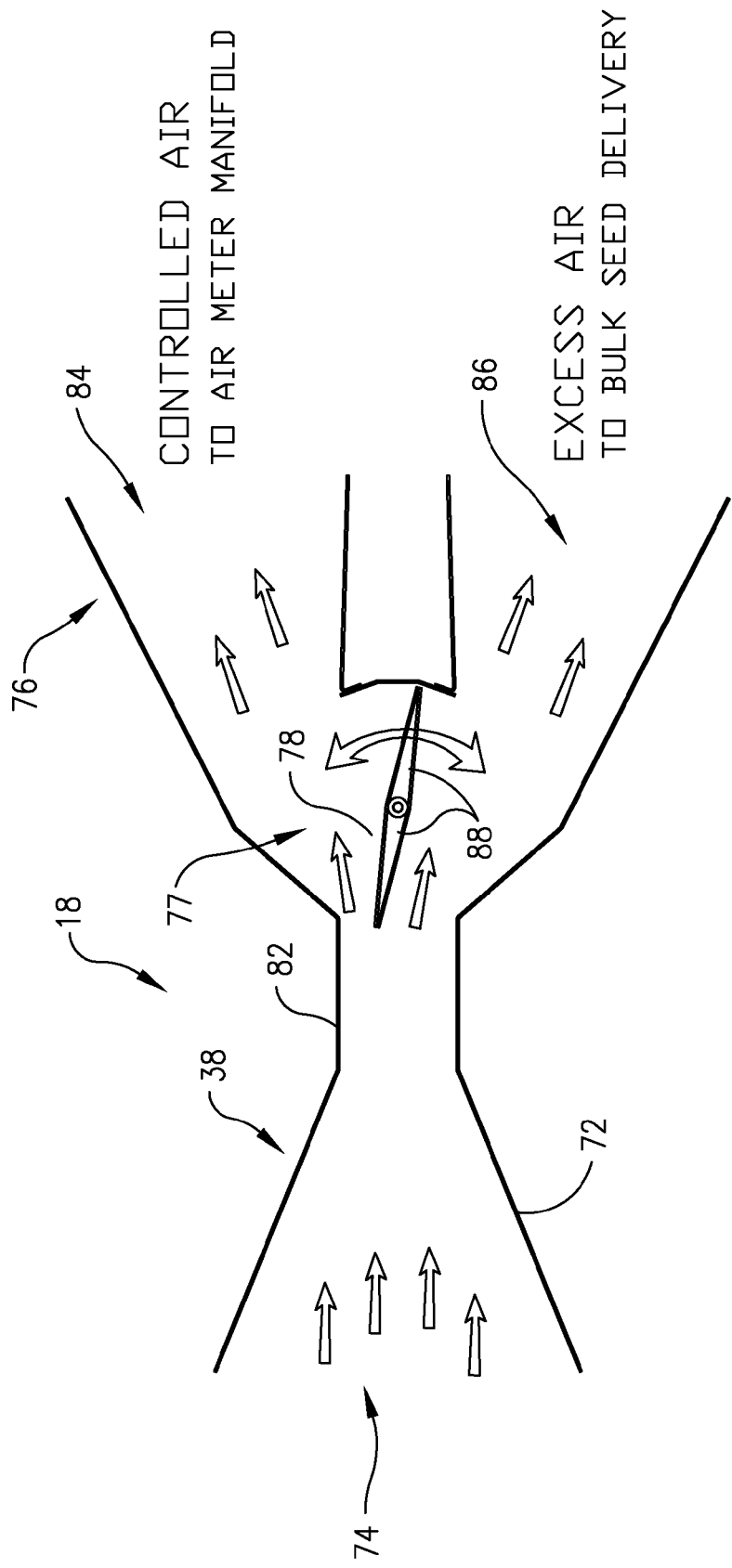
FIG. 4A is a schematic vertical cross-sectional view of an air splitter body of the air handling system of FIG. 1 illustrating a flow of air through the body and a vane mounted within the body.

Referring to FIGS. 3 and 4A, the air splitter assembly 38 is coupled with the fan body 66 and is fluidly interposed between the fan assembly 36 and the primary conveying and metering air lines 24,28. The air splitter assembly 38 comprises an air splitter body 72 having an air inlet end 74 and a divided air outlet end 76, an adjustable air diverter 77 for selectively guiding the direction of the flow of air, and a rotary actuator 80 for selectively positioning the air diverter 77 so as to guide the flow of air through the divided air outlet end 76.

Referring to FIG. 4A, a direction of movement of the flow of air through the air splitter body 72 is illustrated by the arrows. The body 72 includes a narrowed portion 82 that connects the air inlet and air outlet ends 74,76. Air received from the fan assembly 36 is fluidly transported to the air inlet end 74 of the air splitter body 72, then through the narrowed portion 82 of the air splitter body 72, and to the air outlet end 76 of the body 72. Air transported to the air outlet end 76 is then intercepted by the air diverter 77, which is mounted at the divided air outlet end 76.

Referring to FIGS. 2 and 4A, the air outlet end 76 of the air splitter body 72 is divided into a controlled air outlet portion 84 and an excess air outlet portion 86. The controlled air outlet 84 is fluidly connected to the primary metering air line 28, and the excess air outlet 86 is fluidly connected to the primary conveying air line 24. The air diverter 77 is mounted within the air splitter body 72 and generally adjacent and upstream from the controlled air and excess air outlets 84,86.

In the embodiment of the present invention illustrated in FIG. 4A, the air diverter 77 is a vane 78 operable to be rotated by the rotary actuator 80 to allow the flow of air through either or both of the controlled and excess air outlets 84,86 based on a pressure monitored by the air controller 40, as described in more detail below. The vane 78 includes a bi-tapered body 88 with a length approximately equal to a width of an opening between the narrowed portion 82 of the air splitter body 72 and the respective controlled air and excess air outlets 84,86. Thus, when the vane 78 is rotated so as to block the flow of air to the controlled air outlet 84, for example, the vane 78 body is sized and tapered to as to guide air to the excess air outlet 86. In some instances, it may be desirable for the flow of air to be guided to both of the controlled and excess air outlets 84,86, in which case the vane 78 may be positioned generally horizontally, as illustrated in FIG. 4.

The vane 78 is rotated within the air splitter body 72 by the rotary actuator 80, which is mounted on an outside of the air splitter body 72, as illustrated in FIG. 3A. In embodiments of the present invention, the vane 78 may be operable to rotate 360° within the body, although in operation, the vane 78 may only need to rotate approximately 30° above and below horizontal. Additionally and as can be appreciated, the greater the vane 78 rotation angle with respect to either of the controlled and excess air outlets 84,86, the greater the air pressure through the other of the outlets 84,86. Moreover, because the rotary actuator 80 must be controlled based on a desired positioning of the vane 78, the rotary actuator 80 preferably includes circuitry (not shown) that can receive and process an actuator control signal for selective rotation of the vane 78. An exemplary rotary actuator 80 is commercially available from DICKEY-john® Corporation of Auburn, Ill. under Part No. 467096050 or from KZ Valve Co. of Ashland, Neb. under Model No. EH3.

Figure 4B:
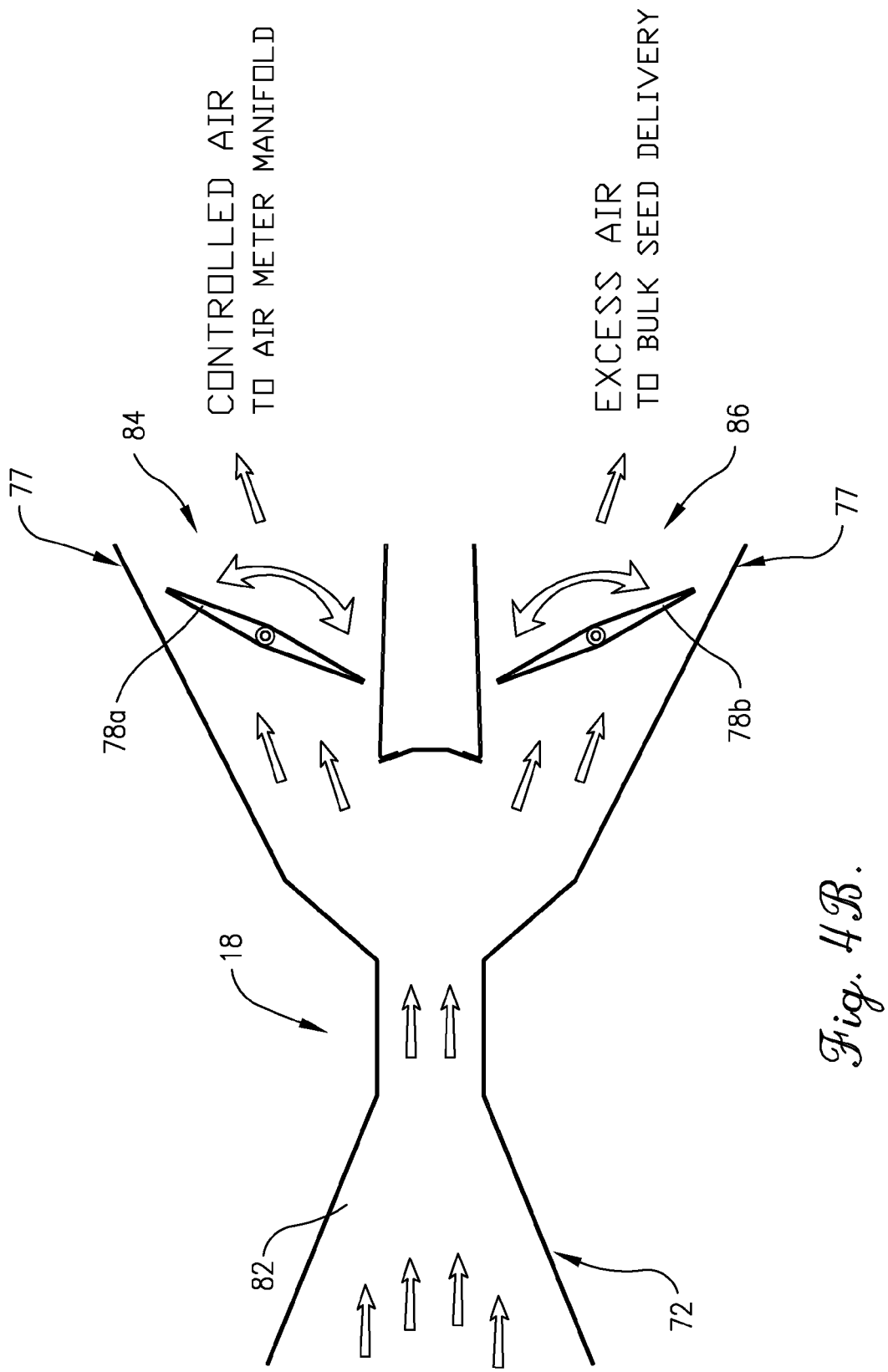
FIG. 4B is a schematic vertical cross-sectional view of an air splitter body of the air handling system of FIG. 1 illustrating a flow of air through the body and a plurality of vanes mounted within the body.

In the alternative embodiment of the present invention illustrated in FIG. 4B, the air diverter 77 comprises a controlled air vane 78a and an excess air vane 78b mounted in the respective controlled air outlet portion 84 and the excess air outlet portion 86 of the air splitter body 72. The vanes 78a,78b are substantially similar to the vane 78, except that they are smaller in size than vane 78. Rotary actuators (not shown) generally similar to the rotary actuator 80 described above are mounted on an outside of the air splitter body 72 for selectively controlling rotation of the vanes 78a,78b. Alternatively, the vanes 78a,78b could be mechanically joined, such that rotation of one vane in one direction inversely rotates the other vane in the opposite direction. As with vane 78, vanes 78a,78b are preferably operable to rotate 360° within the portions 84,86.

Figure 4C:
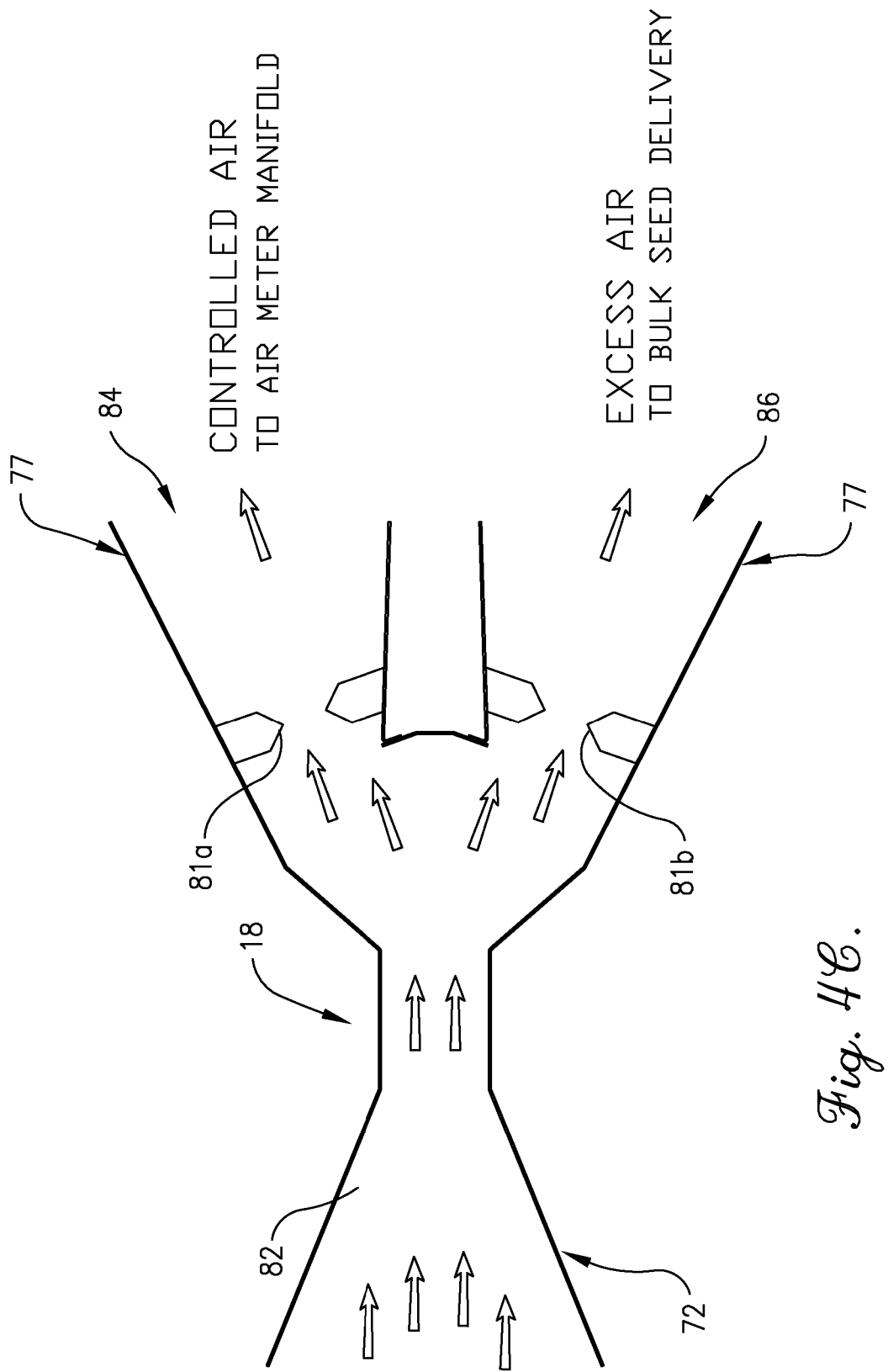
FIG. 4C is a schematic vertical cross-sectional view of an air splitter body of the air handling system of FIG. 1 illustrating a flow of air through the body and a plurality of adjustable orifices mounted within the body.

An even further alternative air diverter 77 is illustrated in FIG. 4C and comprises first and second selectively adjustable orifices 81a,81b positioned within each of the controlled air outlet portion 84 and the excess air outlet portion 86 of the air splitter body 72. Similar to the orifice 59 employed to regulate the air pressure to the singulating meter 58, the orifices 81a, 81b are used to regulate the air through the controlled air outlet portion 84 and the excess air outlet portion 86. The orifices 81a,81b each include an insert that can be adjusted to have a diameter less than a diameter of the respective portions 84,86. If the diameters of the orifices 81a,81b are adjusted to be less than the diameter of the respective portions 84,86, the flow of air through the portions 84,86 will consequently be reduced. As with the multiple vanes 78a,78b, the orifices 81a,81b can be adjusted either through respective actuators (not shown) controlling each orifice 81a,81b or a mechanically-driven lever that controls the diameter of each orifice 81a,81b in an inverse relationship.

Referring to FIG. 3A, the air controller 40 of embodiments of the present invention is operable to monitor and control operation of the rotary actuator 80 and, thus, positioning of the vane 78. In more detail, the air controller 40 comprises a microprocessor 90 for receiving a plurality of pressure signals from one or more pressure sensors 92 and, based on the sensed pressure, selectively controlling positioning of the vane 78 via the rotary actuator 80, a pressure sensor signal line 94, and an actuator control line 96.

In more detail and referring to FIGS. 1-3A, the pressure sensor 92 is mounted on the air manifold 30. As illustrated in FIG. 2, a plurality of meter pressure sensor lines 93 is connected between the pressure sensor 92 and at least a plurality of singulating meters 58. Although a meter pressure sensor line 93 is illustrated in FIGS. 1 and 2 as being connected to each of the singulating meters 58, in operation, only a select number of singulating meters 58 may be monitored. For exemplary purposes only, in a planter 12 having 32 meters 58 across the planter, the system 10 may only monitor 6 of the meters 58. In alternative embodiments of the present invention, each meter 58 may be monitored. Regardless of the number of meters 58 monitored, the pressure for each monitored meter 58 is transmitted along meter pressure sensor line 93 to pressure sensor 92. One suitable pressure sensor 92 is commercially available from DICKEY-john® Corporation of Auburn, Ill. under Part No. 467980496.

The pressure sensor 92 produces a signal representing a pressure at the sensor at any given time. Referring to FIG. 3A, each of the monitored meters 58 provides an air pressure to the sensor 92 via the respective meter pressure sensor line 93. Thus, the pressure at sensor 92 represents a general average of the pressure at each of the monitored meters 58 at any given time.

Upon determination of a pressure at pressure sensor 92, the sensor 92 relays the pressure signal to the microprocessor 90 via primary pressure sensor line 94. Preferably, the pressure sensor 92 is operable to sense and relay at least approximately 20 readings or signals per second so that the microprocessor 90 can generally continuously monitor the pressure to each of the monitored singulating meters 58. Upon receipt of the pressure signal from the pressure sensor 92, the microprocessor 90 calculates an average pressure to each of the monitored meters 58. Based on the pressure determined from the sensor 92 at each monitored meter 58, the pressure for the entire system 10 is accordingly corrected to accomplish the general constant pressure. As can be appreciated, because the air pressure at the sensor 92 is not substantially the same at all times, the microprocessor 90 of embodiments of the present invention provides for filtering of any extremely short or rapid pressure spikes.

As noted above, upon receipt and averaging of the pressure signals, the microprocessor 90 then determines whether more or less air should be provided through the controlled air outlet 84 of the air splitter body 72 and therefore, to the primary seed metering air line 28 based on the average pressure at each of the meters 58. Alternatively, the pressure sensor 92 may include an individual microprocessor (not shown) operably connected to the rotary actuator 80 for control of to the vane 78 so that the pressure sensor 92 is operable to calculate an average pressure and control the rotary actuator 80.

In an alternative embodiment of the present invention illustrated in FIG. 3B, a pressure sensor 92' is mounted on the air manifold 30 and is operable to sense a pressure within the air manifold 30 at any given time. It is to be understood that because the flow of air through the primary metering air line 28 is transported to the air manifold 30, the pressure sensed by the sensor 92' mounted on the air manifold 30 is associated with a pressure through the primary seed metering air line 28. Although only a single pressure sensor 92' is illustrated in FIG. 3B as being mounted on air manifold 30 for the left side 52 of the planter 12, multiple pressure sensors 92' may be mounted on each of the air manifolds 30 of each side 52,54 as needed.

As discussed above, the pressure is used to assist in properly singulating the seeds at the meters 58 of row units 34, and it is preferable that such pressure is regulated and is as generally constant as possible. Otherwise, the singular metering of the seeds is not ideally accomplished. Insufficient pressure may result in a seed not being metered ("skips"), and excessive pressure may result in multiple seeds being metered at a particular location ("doubles"). Thus, in normal operation and employing pressure sensor 92 illustrated in FIG. 3A, the pressure at the singulating meters 58 will be preferably approximately 0 to 10 inches of water, more preferably approximately 0 to 6 inches of water, and most preferably approximately 1 to 4 inches of water. In normal operation and employing pressure sensor 92' illustrated in FIG. 3B, the pressure through the air manifold 30 will be preferably approximately 0 to 12 inches of water, more preferably approximately 0 to 7 inches of water, and most preferably approximately 1 to 5 inches of water. However, as can be appreciated, depending on the size and type of singulating meter 58, the desired pressure at either of the singulating meter 58 or the air manifold 30 may vary.

In contrast to the generally constant air pressure to the seed metering system 16, the air pressure provided through the primary conveying air line 24 need not be constant and instead must simply meet a minimum pressure, such as approximately at least 15 inches of water, sufficient to transport or convey the seeds from the on-demand seed manifold 22, through the secondary conveying air lines 26, and to the row units 34 for metering. Therefore, embodiments of the present invention control the air to the air manifold 30, and therefore to the singulating meter 58, by diverting the flow of air through the controlled air outlet 84 of the air splitter body 72. Upon sufficient pressure being reached at the singulating meter 58 or at the air manifold 30, depending on the respective pressure sensor 92,92' employed, and further upon the pressure being relayed to the microprocessor 90, the microprocessor 90 instructs rotation of the vane 78 by the rotary actuator 80 to divert excess air through the excess air outlet 86 of the air splitter body 72, through the primary seed conveying air line 24, and to the on-demand seed manifold 22. As can be appreciated, for planters that do not include a bulk seed hopper 20 and seed conveying system 14, the excess air could simply be exhausted to atmosphere. An even further alternative is that upon sufficient pressure being reached to the seed metering system 16, the fan speed could be decreased so as to reduce the supply of air, such that 100% of the air flow is directed to the seed metering system 16.

The microprocessor 90 of embodiments of the present invention is therefore operable to receive the pressure signal from the pressure sensor 92,92', determine if the pressure is sufficient, and based on the sufficiency of the pressure, instruct the rotary actuator 80 to actuate the vane 78 by providing an actuator control signal via the actuator control line 96, as illustrated in FIG. 3A. To accomplish these monitoring and control functions, the microprocessor 90 preferably includes or is operably coupled with a memory 98 for storing optimum minimum and maximum pressure values corresponding to the particular seed being planted. Thus, if the pressure is too low, the microprocessor 90 instructs the rotary actuator 80 to rotate the vane 78 counterclockwise so that more air is routed to the controlled air portion 84. The actuator 80 continues to rotate the vane 78 until the pressure rises to the pre-stored, desired value. Conversely, if the pressure is too high, the microprocessor 90 instructs the rotary actuator 80 to rotate the vane 78 clockwise so that less air is routed to the controlled air portion 84. The actuator 80 continues to rotate the vane 78 until the pressure drops to the desired value. The microprocessor 90 is operable to maintain the pressure regardless of operation of the planter 12, such as a change in fan RPM occurring from a change in the tractor engine speed or other hydraulic systems being activated, which consequently alters a flow of oil to the fan 68. As can be appreciated, if alternative air diverters 77 are employed, the microprocessor 90 would operate in a similar manner as described above to maintain the generally constant pressure to the controlled air portion 84.

The memory 98 of embodiments of the present invention may include, for example, removable and non-removable memory elements such as random-access memory (RAM), read-only memory (ROM), flash, magnetic, optical, universal serial bus (USB) memory devices, and/or other conventional memory elements, such as hard-disk drives. The memory 98 may also be operable to store other programmable information. It is further noted that in some instances, multiple minimum and maximum pressure values may be stored in the memory 98 of the microprocessor 90 depending on preferred operating characteristics and parameters of the planter 12.

As noted above, because operation of the planter 12 may sometimes produce rapid and significant fluctuations in the air pressure, it is preferable that the microprocessor 90 generally continuously monitor the pressure to the meter 58 or through the air manifold 30, as the case may be. Therefore, in embodiments of the present invention, the microprocessor 90 may implement a computer program that performs at least some of the functions described herein. The computer program comprises an ordered listing of executable instructions or code segments for implementing logical functions. The computer program can be embodied in any computer-readable medium for use by or in connection with an instruction execution system, apparatus, or device, and execute the instructions. As used herein, a "computer-readable medium" can be any structure that can contain, store, communicate, propagate, or transport the computer program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium include the following: an electrical connection having one or more wires, a random access memory (RAM), a read-only memory (ROM), an erasable, programmable, read-only memory (EPROM or Flash memory), a portable computer diskette, and a portable compact disk read-only memory (CDROM).

Additionally, the microprocessor 90 of embodiments of the present invention may also include microcontrollers, programmable intelligent computers (PICs), field-programmable gate arrays (FPGAs) or other programmable logic devices (PLDs), fully-custom or semi-custom application-specific integrated circuits (ASICs), or any other device that is described by one or more code segments of a hardware description language (HDL). Further, the microprocessor 90 may include combinations of any of the above-listed components. An exemplary microprocessor 90 for use with embodiments of the present invention is manufactured by DICKEY-John® Corporation of Auburn, Ill. under the trademark "INTELLIAG™."

In alternative embodiments of the present invention, it is contemplated that the microprocessor 90 is operably connected to a remote computing device (not shown) for review of pressure values and other operating characteristics of the planter 12, for control or providing of instructions to the planter 12, for receipt of information regarding the planter 12, or any other desired activity relating to the operation of the planter 12. In even further alternative embodiments of the present invention, the microprocessor 90 is operable to access a conventional Internet connection or other communications network (not shown), such as a local area network, a wide area network, a wireless network, or an intranet.

Although an exemplary planter 12 is illustrated in the drawing figures, it should be appreciated the embodiments of the present invention can be used with any air-assisted planter. Further, although the present invention has been described with respect to a planter, embodiments of the present invention could conceivably be used with a drill that dispenses a stream of multiple seeds into a furrow.

Figure 5:
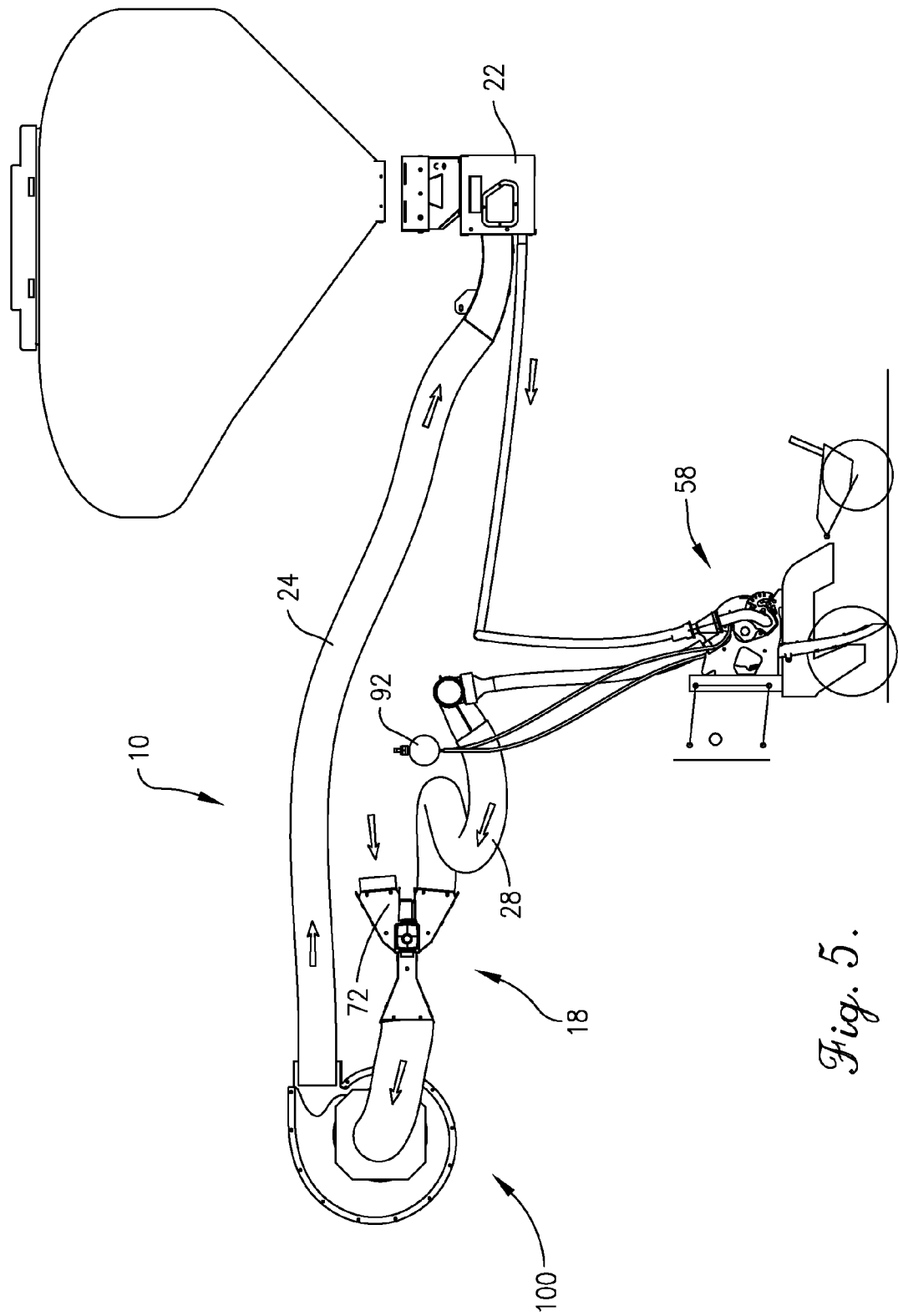
FIG. 5 is a schematic system view of a negative air-assisted planting system of alternative embodiments of the present invention and illustrating a flow of air through the system.

Additionally, although the air-assisted planting system 10 has been described with positive pressure air, the air-assisted planting system 10 of embodiments of the present invention could also be used for negative or vacuum air pressure, such as may be used with vacuum seed meters. For example, FIG. 5 illustrates a negative pressure air-assisted planting system 10'. The system 10' includes an air handling system 18 having a vacuum assembly 100 instead of a fan assembly 36. Furthermore, the singulating meter 58 is a vacuum meter. The system 10' is substantially similar in operation to the positive-pressure air system, except that instead of pushing air through the primary seed conveying and metering air lines 24, 28, a vacuum is applied along the seed metering air line 28 so that an intake of air occurs at the singulating meter 58 and at the air splitter body 72. The air is then transported along the primary seed metering air line 58, through the vacuum assembly 100, along the primary seed conveying air line 24, to the seed manifold 22, and to the singulating meter 58, as illustrated by the direction of the arrows in FIG. 5. The system 10' still employs a sensor substantially similar to the above-described sensor 92 that monitors the air pressure at the singulating meter 58 and controls the amount of air intake from atmosphere in substantially the same manner as for the positive-pressure system.

As noted above, a minimum air pressure must also be provided to the on-demand seed manifold 22; otherwise, seeds will not be conveyed to the row units 34. Nonetheless, the pressure to the seed manifold 22 need not be generally constant. Therefore, in alternative embodiments of the present invention, a pressure sensor (not shown) may be coupled with the primary conveying air line 24 and/or the on-demand seed manifold 22 to determine the pressure at such locations at a given time. In even further alternative embodiments of the present invention, maximum pressure values to the on-demand seed manifold 22 may be stored in the memory 98 of the microprocessor 90 so as to insure not too much air is being provided to the seed manifold 22, which may adversely affect conveyance of the seeds to the row units 34. An exemplary maximum air pressure value to the seed conveying system 14 is approximately 30 inches of water.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A planter for planting seeds in the ground as the planter advances along a path of travel, the planter comprising:

a mobile frame;

a seed conveying system mounted on the frame and including— a seed manifold operable to contain a supply of seeds, a primary seed conveying air line operable to supply air under pressure to the seed manifold, and a plurality of secondary seed conveying lines fluidly connected to the manifold for transporting seeds and air from the seed manifold;

a seed metering system mounted on the frame and including— a primary seed metering air line, a seed metering air manifold extending across a general width of the planter and connected to the primary seed metering air line, a plurality of secondary seed metering air lines connected to the air manifold, and a plurality of singulating meters respectively connected to the plurality of secondary seed metering air lines; and an air handling system mounted to the frame and operable to produce, monitor, and control a flow of air to the seed conveying and seed metering systems, the air handling system including— a fan assembly including a single fan for producing a flow of air, an air splitter assembly fluidly interposed between the fan assembly and the primary seed conveying air line and the primary seed metering air line and operable to selectively control the flow of air produced by the fan assembly through either or both of the seed conveying air line and the seed metering air line, and an air controller for monitoring and controlling the flow of air, the air controller including— at least one pressure sensor associated with the primary seed metering air line and operable to produce a pressure signal, and a microprocessor operable to receive the pressure signal and in response, instruct the air splitter assembly to selectively control the flow of air so as to provide a generally constant air pressure to the primary seed metering air line.

2. The planter of claim 1, wherein the air splitter assembly includes an air splitter body having an air inlet end and a divided air outlet end.

3. The planter of claim 2, wherein the air inlet end of the air splitter body is fluidly connected to the fan assembly, such that the flow of air produced by the fan assembly is received by the air splitter assembly.

4. The planter of claim 3, wherein the divided air outlet end of the air splitter body includes a controlled air portion and an excess air portion.

5. The planter of claim 4, wherein the controlled air outlet of the air splitter body is fluidly connected to the primary seed metering air line, and the excess air outlet is fluidly connected to the primary seed conveying air line.

6. The planter of claim 5, wherein the air splitter assembly further includes an adjustable air diverter mounted in the air splitter body for diverting the flow of air through the controlled air and excess air outlets of the air splitter body.

7. The planter of claim 6, wherein the air diverter is a vane that may be selectively positioned so as to guide the flow of air through either or both of the controlled air outlet or excess air outlet.

8. The planter of claim 7, the air splitter assembly further including a rotary actuator operable to rotate the vane for the selective positioning, wherein the rotary actuator is operably connected to the microprocessor.

9. The planter of claim 8, wherein the microprocessor is operable to instruct the rotary actuator to rotate the vane so as to provide the generally constant air pressure to the primary seed metering air line.

* * * * *